Patented Sept. 20, 1932

1,878,557

UNITED STATES PATENT OFFICE

OTTMAR WAHL, OF LEVERKUSEN-ON-THE-RHINE, GERMANY, ASSIGNOR TO GENERAL ANILINE WORKS INC., OF NEW YORK, N. Y., A CORPORATION OF DELAWARE

ASYMMETRIC POLYMETHINE DYESTUFFS

No Drawing. Application filed June 24, 1929, Serial No. 373,474, and in Germany June 28, 1928.

The present invention relates to a process of preparing polymethine dyestuffs and to the new products obtainable thereby, more particularly it relates to dyestuffs of the probable general formula:

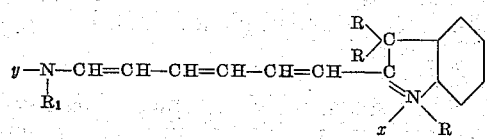

wherein the R's represent alkyl groups, $R_1$ for hydrogen or alkyl, $x$ stands for a monovalent radical of a strong inorganic acid and $y$ stands for a radical of the benzene series or for the cyano group.

My new dyestuffs are obtainable by causing to react together in acetic acid anhydride in about molecular quantities a pyridinium salt the nitrogen of which is labile, such as the dinitrophenyl pyridinium chloride or a pyridinium cyano-halogenide, with a 1.3.3-trialkyl-2-methylene-indoline of the formula:

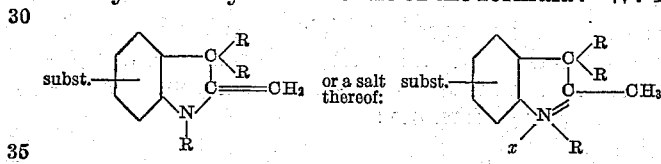

the R's meaning alkyl groups, $x$ a monovalent acid radical and "subst." any substituents, advantageously while gently heating the reaction mixture, say between about 20 and about 70° C. A good method of carrying out my process consists in dissolving the pyridinium salt in acetic acid anhydride, and slowly introducing while stirring the 1.3.3-trialkyl-2-methylene-indoline while heating at about 30 to about 40° C. and keeping the reaction mixture at this temperature, stirring being continued. In this manner the above identified dyestuff, in which $y$ represents the cyano group or a dinitrobenzene nucleus are obtainable. The reaction mixture is poured into water and filtered while hot from a resinous residue eventually present. On cooling the dyestuff crystallizes; if desired the separation of the dyestuff can be favored by the addition of common salt. The process proceeds according to the following scheme:

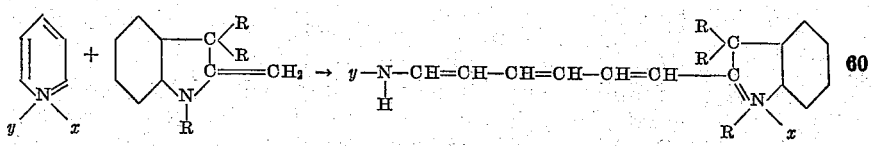

$y$ meaning the cyano group or the dinitrophenyl residue, $x$ a monovalent acid radical, and the R's alkyl groups.

The dyestuffs wherein $y$ quite generally represents a substituted or unsubstituted benzene nucleus are obtainable by first causing a primary or secondary amine to react with a pyridinium cyano halogenide or a dinitrophenyl pyridinium chloride (compare W. König, Journal für praktische Chemie, vol. 69, page 105, and Zincke, Annalen der Chemie, vol. 330, page 361). and then reacting upon the compound formed with an about equimolecular quantity of a 1.3.3-trialkyl-2-methylene indoline in acetic acid anhydride, favorably while gently heating, say between about 20 and about 70° C; generally I heat the mixture at about 30 to about 40° C.

The whole process may be represented by the following scheme:

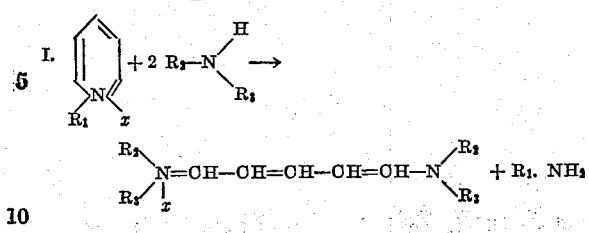

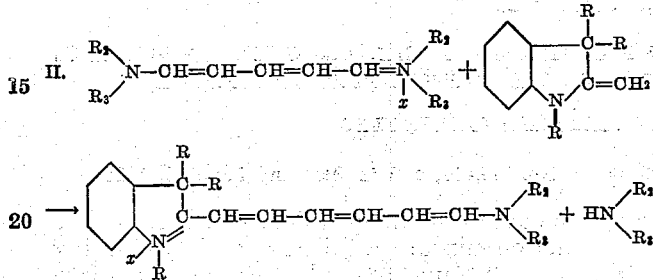

R meaning alkyl, $R_1$ the dinitrophenyl residue or the cyano group, $R_2$ an aromatic nucleus, $R_3$ hydrogen or alkyl and $x$ a monovalent acid radical of a strong inorganic acid.

My new dyestuffs are generally dark metallic lustrous powders, difficultly soluble in cold water, dyeing blue to green shades.

The invention is illustrated by the following examples, without being limited thereto:

*Example 1.*—1 mol of dinitrophenyl pyridinium chloride and 1 mol of 1.3.3-trimethyl-2-methylene indoline are introduced into acetic acid anhydride. The mixture is heated to about 35° C. and kept at this temperature while stirring; then it is poured into hot water and filtered. On cooling the dyestuff crystallizes; it has the following formula:

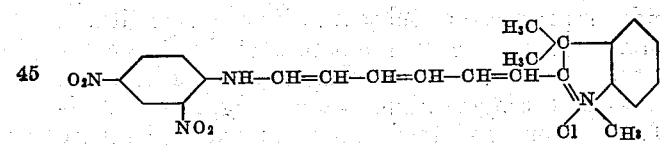

and dyes tanned cotton bluish-green shades.

The corresponding dyestuff from 5-amido-1.3.3-trimethyl-2-"methylene indoline" dyes somewhat greener shades.

*Example 2.*—1 mol of the yellow dyestuff of the formula:

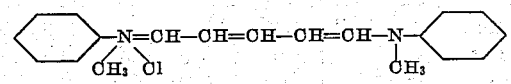

(obtainable from one mol of dinitrophenylpyridinium chloride and 2 mols of methylaniline) and 1 mol of 1.3.3-trimethyl-2-methyleneindoline are introduced into acetic acid anhydride while gently heating, and the mixture is stirred for several hours. The melt is dissolved in hot water; the dyestuff is salted out and is obtained in the form of a greenish crystalline powder, it dyes tanned cotton bluish green shades and has the following structural formula:

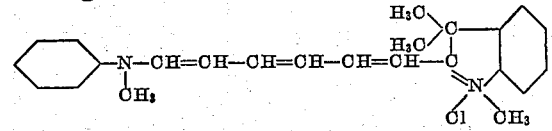

The corresponding dyestuff from 5-amino-1.3.3-trimethyl-2-methylene indoline dyes bluish green shades.

I claim:

1. The process which comprises heating in acetic acid anhydride solution about aquimolecular quantities of a compound of the general formula:

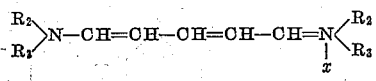

wherein $R_2$ stands for a radical of the benzene series, $R_3$ stands for hydrogen or an alkyl group, and $x$ stands for a monovalent radical of a strong inorganic acid and a 1.3.3-trialkyl-2-methylene indoline between about 20 and about 70° C.

2. The process which comprises heating in acetic acid anhydride solution about equimolecular quantities of a compound of the general formula:

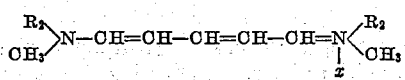

wherein $R_2$ stands for a benzene nucleus and $x$ stands for a monovalent radical of a strong inorganic acid, and a 1.3.3-trialkyl-2-methylene indoline between about 20 and about 70° C.

3. The process which comprises heating in acetic acid anhydride solution about equimolecular quantities of a compound of the formula:

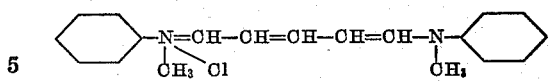

and 1.3.3-trimethyl-2-methylene indoline at about 30 to about 40° C.

4. As new products the dyestuffs of the probable general formula:

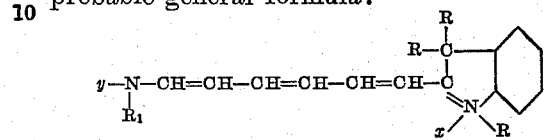

wherein $R_1$ stands for hydrogen or an alkyl group, $x$ stands for a monovalent radical of a strong inorganic acid, $y$ stands for a substituent of the group consisting of the cyano group and a radical of the benzene series, and the R's stand for alkyl groups, said dyestuffs being generally dark metallic lustrous powders, difficultly soluble in cold water, dyeing blue to green shades.

5. As new products the dyestuffs of the probable general formula:

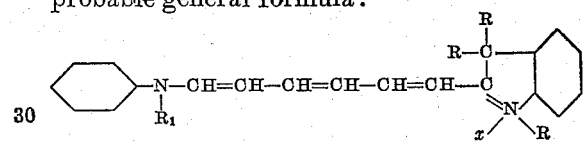

wherein $R_1$ and R stand for alkyl groups, and $x$ stands for a monovalent radical of a strong inorganic acid, said dyestuffs being generally dark metallic lustrous powders, difficultly soluble in cold water, dyeing blue to green shades.

6. As a new product the dyestuff of the following formula:

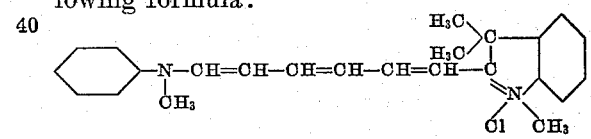

said dyestuff being a dark green metallic lustrous powder, dyeing tanned cotton greenish-blue shades.

In testimony whereof I have hereunto set my hand.

OTTMAR WAHL.